(12) United States Patent
Park

(10) Patent No.: US 11,938,950 B2
(45) Date of Patent: Mar. 26, 2024

(54) VEHICLE AND METHOD OF CONTROLLING THE SAME

(71) Applicants: Hyundai Motor Company, Seoul (KR); Kia Corporation, Seoul (KR)

(72) Inventor: Min Ha Park, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/856,686

(22) Filed: Jul. 1, 2022

(65) Prior Publication Data

US 2023/0111748 A1 Apr. 13, 2023

(30) Foreign Application Priority Data

Oct. 8, 2021 (KR) .................. 10-2021-0134121

(51) Int. Cl.
*B60W 40/08* (2012.01)
*B60R 16/037* (2006.01)
*B60W 50/14* (2020.01)

(52) U.S. Cl.
CPC ........... *B60W 40/08* (2013.01); *B60R 16/037* (2013.01); *B60W 50/14* (2013.01); *B60W 2040/0809* (2013.01); *B60W 2040/0881* (2013.01); *B60W 2050/146* (2013.01); *B60W 2420/42* (2013.01)

(58) Field of Classification Search
None
See application file for complete search history.

(56) References Cited

U.S. PATENT DOCUMENTS

| 2013/0297099 | A1* | 11/2013 | Rovik ..................... B60R 25/01 701/2 |
| 2018/0018179 | A1* | 1/2018 | Scheufler ............. H04L 67/306 |
| 2019/0122060 | A1* | 4/2019 | Sudo ................... G06V 20/593 |
| 2021/0188287 | A1* | 6/2021 | Taveira ................. B62D 1/183 |

* cited by examiner

*Primary Examiner* — Thomas S McCormack
(74) *Attorney, Agent, or Firm* — MORGAN, LEWIS & BOCKIUS LLP

(57) ABSTRACT

A vehicle includes a plurality of electronic control units (ECUs); a communicator configured to detect a personal identification device of an occupant and receive an identification (ID) of the occupant from the personal identification device of the occupant; and at least one processor electrically connected to the communicator and configured to determine a position of the personal identification device, wherein the processor is configured to, in response that the ID of the occupant corresponds to an pre-stored ID, generate a control signal for controlling the plurality of ECUs to perform a function that matches the pre-stored ID for an occupant seat corresponding to the determined position.

15 Claims, 8 Drawing Sheets

VEHICLE AND METHOD OF CONTROLLING THE SAME

CROSS-REFERENCE TO RELATED APPLICATION(S)

The present application claims priority to Korean Patent Application No. 10-2021-0134121, filed on Oct. 8, 2021 the entire contents of which is incorporated herein for all purposes by this reference.

BACKGROUND OF THE PRESENT DISCLOSURE

Field of the Present Disclosure

The present disclosure relates to a vehicle for recognizing an identification (ID) of a vehicle occupant, and a method for controlling the same.

Description of Related Art

Generally, smart key systems allow a driver to open or close a door of a vehicle and start the vehicle from outside without inserting a separate key into a vehicle's key box or any particular manipulation for operation. In the smart key Systems, a smart key such as a smart card which is easy to carry or a Fob for a wireless communication is used.

In a conventional smart key system, functions predetermined by a driver is automatically performed by recognizing the driver possessing a smart key.

However, for passengers of a vehicle except a driver, functions in the vehicle were not automatically performed by recognizing such a smart key. Furthermore, when a driver is changed while driving of the vehicle, the functions set in advance for the changed driver and passenger could not be performed.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for enhancing convenience of passengers by automatically performing pre-stored functions when a passenger, who has a personal identification device embedded an ID pre-stored in a vehicle, gets on the vehicle, and a method of controlling the same.

Another aspect of the present disclosure is to provide a vehicle in which functions pre-stored by a passenger moving to a passenger seat is automatically performed to facilitate convenience when a driver's change occurs, and a method of controlling the same.

Additional aspects of the present disclosure will be set forth in part in the description which follows, and in part, will be obvious from the description, or may be learned by practice of the present disclosure.

In accordance with an aspect of the present disclosure, a vehicle includes a plurality of electronic control units (ECUs); a communicator configured to detect a personal identification device of an occupant and receive an identification (ID) of the occupant from the personal identification device of the occupant; and at least one processor electrically connected to the communicator and configured to determine a position of the personal identification device, wherein the processor is configured to, in response that the ID of the occupant corresponds to an pre-stored ID, generate a control signal for controlling the plurality of ECUs to perform a function that matches the pre-stored ID for an occupant seat corresponding to the determined position.

The processor is configured to determine the position of the personal identification device in response that the ID of the occupant corresponds to a pre-stored ID.

The vehicle may further include a plurality of weight sensors mounted on each of occupant seats, wherein the processor is configured to determine the position of the personal identification device according to the ID of the occupant received by the communicator from the personal identification device of the occupant and detected results of the plurality of weight sensors.

The function matching the pre-stored ID may include at least one of adjusting a position of the occupant seat, adjusting an air conditioner, adjusting a window, and adjusting a heating wire of the occupant seat of the vehicle.

The vehicle may further include a display, wherein the processor is configured to provide a user interface to the display for inputting a new set value for a new ID in response that the ID of the occupant does not match the pre-stored ID.

The processor may be configured to, when doors of a driver seat and a front passenger seat of the vehicle are opened or closed, determine that a driver's change is occurred in response that the position of the personal identification device is changed from the front passenger seat to the driver seat or from the driver seat to the front passenger seat, or weights of the driver seat and the front passenger seat are changed.

The processor may be configured to, in response to determining that the driver's change is occurred, generate a control signal for controlling the plurality of ECUs to perform a function that matching the pre-stored ID for the front passenger seat when the ID of the occupant who seats the front passenger seat matches the pre-stored ID.

The vehicle may further include a camera, wherein the processor is configured to conclude that the driver's change is occurred in response that a face of the driver photographed by the camera changes.

The processor may be configured to, in response to determining that the driver's change is occurred, generate a control signal for controlling the plurality of ECUs to perform a function that matching the pre-stored ID for the front passenger seat when the ID of the occupant who seats the front passenger seat matches the pre-stored ID.

The personal identification device may include any one of a smart key, a card key, or a Fob key embedded in a smart phone.

The communicator may include any one of an ultra-wideband communication (UWB) antenna, a Bluetooth Low Energy (BLE) antenna, or a Wireless Power Consortium (WPC)/Near Field Communication (NFC) antenna.

In accordance with another aspect of the present disclosure, a method for controlling a vehicle, the method includes the steps of detecting a personal identification device of an occupant; receiving an identification (ID) of the occupant from the personal identification device of the occupant; determining a position of the personal identification device in response that the ID of the occupant matches a pre-stored ID; and generating a control signal for controlling a plurality of electronic control units (ECUs) to perform a function that matches the pre-stored ID for an occupant seat corresponding to the determined position.

The step of determining may be configured to determine the position of the personal identification device according to the ID of the occupant received from the personal identification device of the occupant and a result of detection of a plurality of weight sensors.

The pre-stored function may include at least one of adjusting a position of the occupant seat, adjusting an air conditioner, adjusting a window, and adjusting a heating wire of the occupant seat of the vehicle.

The method may further include a step of providing a user interface for inputting a new set value for a new ID in response that the ID of the occupant does not match the pre-stored ID.

The method may further include a step of, when doors of a driver seat and a front passenger seat of the vehicle are opened or closed, determining that a driver's change is occurred in response that the position of the personal identification device is changed from the front passenger seat to the driver seat or from the driver seat to the front passenger seat, or weights of the driver seat and the front passenger seat are changed.

The method may further include a step of determining that a driver's change is occurred in response that a face of the driver photographed by a camera changes.

The method may further include a step of, in response to determining that the driver's change is occurred, generating a control signal for controlling the plurality of ECUs to perform a function that matches the pre-stored ID for the front passenger seat when the ID of the occupant who seats the front passenger seat matches the pre-stored ID.

The personal identification device may include any one of a smart key, a card key, or a Fob key embedded in a smart phone.

The steps of detecting and determining may be configured to use any one of an ultra-wideband communication (UWB) antenna, a Bluetooth Low Energy (BLE) antenna, or a Wireless Power Consortium (WPC)/Near Field Communication (NFC) antenna.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
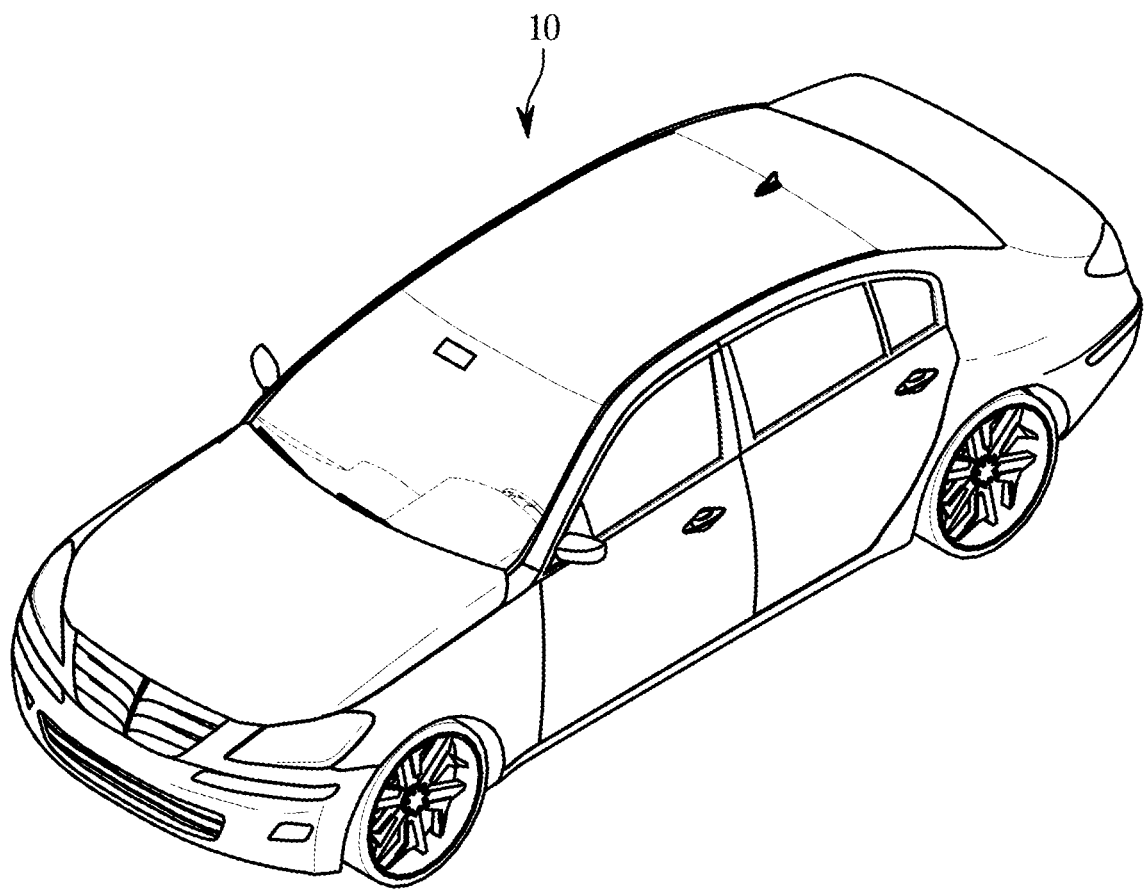
FIG. 1 is a view exemplarily illustrating an exterior of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings, wherein like reference numerals refer to like elements throughout. This specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

FIG. 1 is a view exemplarily illustrating an exterior of a vehicle.

Referring to FIG. 1, an exterior of a vehicle 10 according to an exemplary embodiment of the present disclosure includes wheels for moving the vehicle 10, a door 44 that shields an interior of the vehicle 10 from outside, a windshield that provides a front view of the vehicle 10 to a driver inside the vehicle 10, and a side mirror that provides a view of the rear of the vehicle 10 to the driver inside the vehicle 10.

The vehicle 10 may drive based on various driving modes, such as a comfort mode, an economical mode, or a sports mode.

The comfort mode is the most common driving mode, also typically refers to a normal mode. The comfort mode is a driving mode that provides a user with a smooth driving and comfortable riding experience.

The economical mode is a driving mode for improving fuel efficiency, and is a driving mode configured for improving fuel efficiency by controlling an engine and transmission of the vehicle 10. The economical mode may suppress a driving that deteriorates fuel efficiency, such as rapid acceleration compared to the comfort mode.

The sports mode is a driving mode for providing a more dynamic and sporty driving environment to a driver. In the sports mode, a steering wheel, a suspension, an engine, and a transmission may be appropriately controlled for dynamic and sporty driving. For example, when the user changes the driving mode to the sports mode, settings of the steering wheel and the suspension may become firmer or heavier.

The door 44 is rotatably provided on left and right sides of the vehicle 10. When the door is opened a driver or a passenger may get on the inside of the vehicle 10, and when the door is closed the interior of the vehicle 10 is shielded from the outside. Furthermore, a handle for opening and closing the door 44 may be provided outside the vehicle 10, and an antenna for transmitting a communication signal may be mounted on the handle. Although the antenna is shown on the handle of a driver side, an antenna for transmitting a communication signal may be mounted on the handle on the passenger side as well. In other words, the antenna may be mounted on at least one of the left and right handles. Furthermore, the antenna for transmitting and receiving communication signals may be provided various places inside the vehicle.

The windshield is provided on an upper front side of the vehicle 10 so that the driver inside the vehicle 10 may obtain visual information regarding the front of the vehicle 10, and is also referred to windshield glass.

Furthermore, the side mirror includes a left side mirror provided on the left side of the vehicle 10 and a right side mirror provided on the right side of the vehicle 10, and allows the driver inside the vehicle 10 to obtain visual information regarding left and right sides and rear side of the vehicle 10.

Furthermore, the vehicle 10 may include a detection device such as a proximity sensor that detects obstacles or other vehicles on the rear side or left and right sides of the vehicle 10, a rain sensor that detects rainfall and precipitation, a camera, a radar sensor, a Light Detection and Ranging (LiDAR) sensor, and the like. However, the exemplary embodiment of the present disclosure is not limited thereto, and may further include a camera configured for identifying an occupant in the vehicle 10, a weight sensor, and the like.

Meanwhile, the proximity sensor may transmit a detection signal to the left and right sides or rear side of the vehicle, and receive a reflected signal reflected from an obstacle such as other vehicles. In other words, the proximity sensor may detect the presence of an obstacle on the left and right sides or the rear side of the vehicle 10 based on a waveform of the received reflected signal, and identify the position of the obstacle. As an example of such a proximity sensor, a method of transmitting ultrasonic waves or infrared rays and detecting a distance to the obstacle using ultrasonic waves or infrared rays reflected from the obstacle may be employed. For example, the proximity sensor may include at least one of a radar sensor and a Light Detection and Ranging (LiDAR) sensor, but is not limited thereto.

Figure 2:
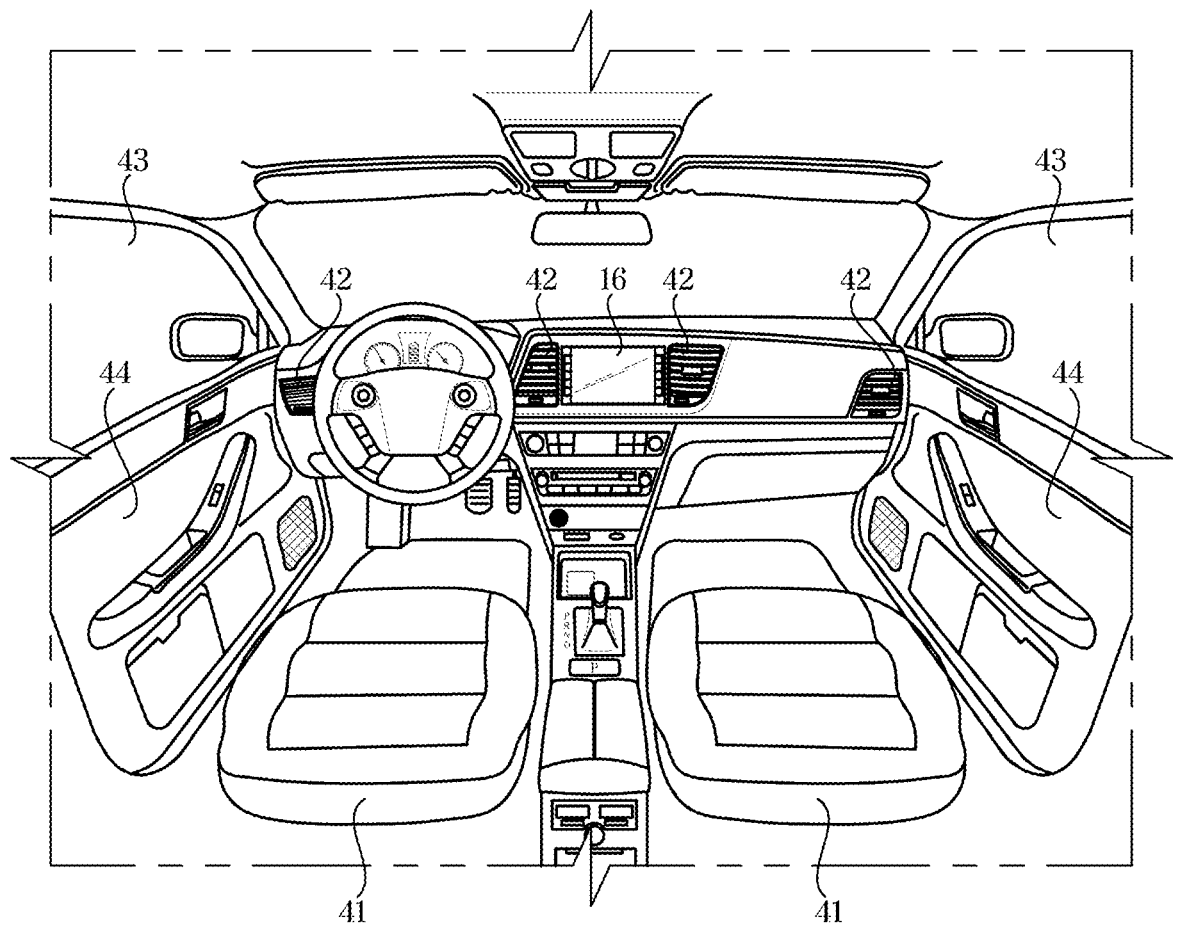
FIG. 2 is a view exemplarily illustrating an interior of a vehicle according to an exemplary embodiment of the present disclosure.

FIG. 2 is a schematic view for explaining the interior of a vehicle according to an exemplary embodiment of the present disclosure.

Referring to FIG. 2, the vehicle 10 may include the door 44 configured for shielding and a window 43 configured for opening and closing, for each seat of occupant. Furthermore, the vehicle 10 may be provided with a sound output device configured for outputting acoustic sound, and the sound output device may be a speaker. The sound output device may output acoustic sound necessary for performing an audio function, a video function, a navigation function, and other additional functions.

For example, the sound output device may be provided in each of the left and right doors 44 and 44, and may be provided in other areas, such as the door 44 of a rear seat or a dashboard, if necessary.

Furthermore, a display 16 may be provided in a center portion of the dashboard of the vehicle. The display 16 may provide a user interface for inputting a new function setting value with respect to a new identification (ID) of an occupant, as will be described later.

A steering wheel is provided on the dashboard of the driver seat side, and a key groove into which a remote control device may be inserted may be formed in an area adjacent to the steering wheel. When the remote control device is inserted into the key groove or authentication between the remote control device and the vehicle 10 is completed via a wireless communication network, the remote control device and the vehicle 10 may be connected.

Furthermore, a start button for turning ON/OFF ignition of the vehicle 10 may be provided on the dashboard, and when the remote control device is inserted into the key groove or the authentication between the remote control device and the vehicle 10 via a wireless communication network is successful, the ignition of the vehicle 10 may be turned on by pressing for a user the start button.

On the other hand, the vehicle 10 is provided with an air conditioner 42 to perform both heating and cooling, and the temperature inside the vehicle 10 may be controlled by discharging the heated or cooled air through a vent.

As described above, the vehicle 10 may provide various functions and the various functions may be pre-stored. Accordingly, the pre-stored functions are automatically performed in response that the occupant gets on the vehicle 10, so that convenience of the occupant may be promoted.

Hereinafter, a process in which the vehicle 10 automatically performs a predetermined function will be described in detail.

Figure 3:
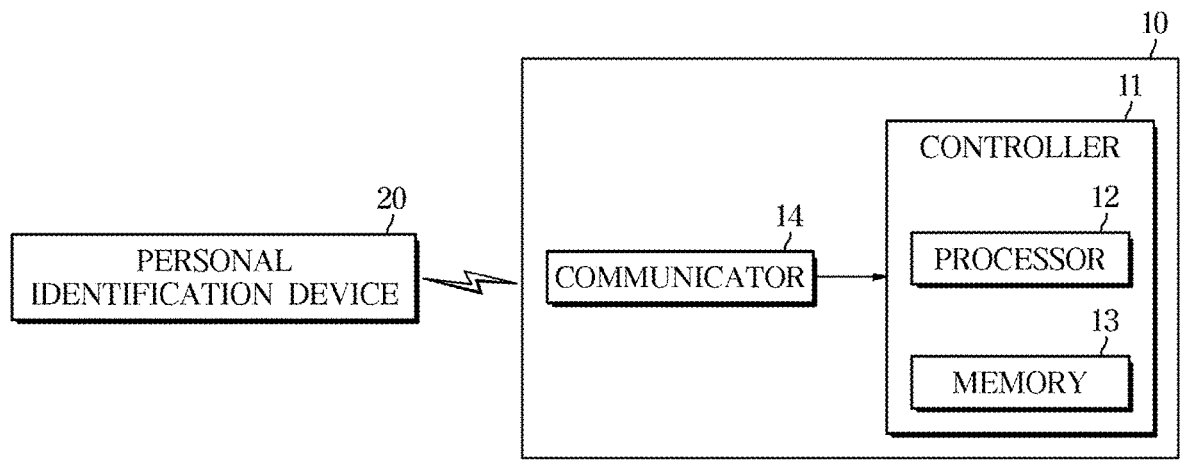
FIG. 3 is a control block diagram illustrating communication with a personal identification device.

FIG. 3 is a control block diagram illustrating communication with a personal identification device.

Referring to FIG. 3, the vehicle 10 may include a plurality of electronic control units (ECUs) 18, a communicator 14 and a controller 11, and the controller 11 may include a processor 12 and a memory 13.

The communicator 14 may communicate with a personal identification device 20 to detect the personal identification device 20 of an occupant, and receive the ID of the occupant from the personal identification device 20 of the occupant.

The controller 11 may include the memory 13 that stores a control program and control data for controlling the plurality of ECUs 18, and a processor 12 that generates a control signal according to the control program and control data stored in the memory. The memory 13 and the processor 12 may be provided integrally or separately.

The memory 13 may store programs and data for detecting the personal identification device 20, determining a position of the personal identification device 20, and performing a function matching the ID pre-stored in an occupant seat corresponding to the determined location. Furthermore, the memory 13 may store the ID of the occupant to perform a function set by the occupant.

The memory 13 may include a volatile memory for temporarily storing data, such as a static random access memory (S-RAM), a dynamic random access memory (D-RAM). Furthermore, the memory 112 may include a non-volatile memory for storing data for a long time period, such as a Read Only Memory (ROM), an Erasable Programmable Read Only Memory (EPROM), and an Electrically Erasable Programmable Read Only Memory (EEPROM).

The processor 12 may include various logic circuits and arithmetic circuits, and process data according to a program provided from a memory and generate a control signal according to a result of processing.

For example, the processor 12 may determine the position of the personal identification device 20, and generate a control signal to perform the function matching the ID pre-stored in the occupant seat corresponding to the determined location.

Accordingly, the controller 11 may detect the personal identification device 20, determine the position of the personal identification device 20, and controls to perform the function matching the ID pre-stored in the occupant seat corresponding to the determined location.

In response that the ID of the occupant matches the pre-stored ID, the processor 12 may determine the position of the personal identification device 20.

In response that the communicator 14 detects the personal identification device 20 of the occupant and receives the ID of the occupant from the personal identification device 20, the processor 12 may compare the received ID with the ID pre-stored in the memory 13.

As a result of the comparison, in response that the received ID matches the ID pre-stored in the memory 13, the processor 12 may determine the position of the personal identification device 20 of the occupant to perform the function pre-stored in a seat where the occupant seats.

In response that the received ID does not match the ID pre-stored in the memory 13, the processor 12 provides a user interface for inputting a new setting value, which will be described later.

Accordingly, in response to determining the position of the personal identification device 20 of the occupant, the processor 12 may control the plurality of ECUs 18 to perform the function matching the ID pre-stored in the occupant seat corresponding to the determined location.

Figure 4:
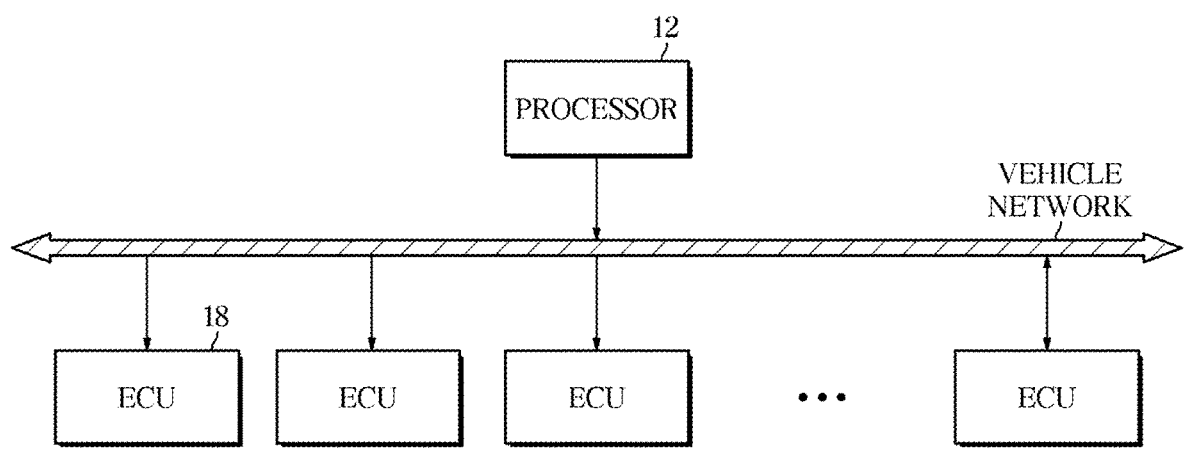
FIG. 4 is a view exemplarily illustrating that a processor is configured to control a plurality of ECUs.

FIG. 4 is a view exemplarily illustrating that the processor controls the plurality of ECUs.

The processor 12 may determine the position of the personal identification device 20, and generate a control signal for controlling the plurality of ECUs 18 to perform the function matching the ID pre-stored in the occupant seat corresponding to the determined location.

The processor 12 and the plurality of ECUs 18 may communicate with each other via the communication network (NT). For example, the electrical parts 30 may exchange data through an Ethernet, a Media Oriented Systems Transport (MOST), a Flexray, a Controller Area Network (CAN), a Local Interconnect Network (LIN), and the like.

The pre-stored functions may include adjusting at least one of a height of the seat 41 of the occupant, a position of the seat such as inclination of a backrest, an intensity and temperature of the air conditioner, a position of the window 43, or heat generation of a heating wire of the seat 41.

The pre-stored functions are not limited to the above, and may include various functions affecting the occupant who seats on the occupant seat.

Accordingly, the processor 12 may determine the position of the personal identification device 20 and control the plurality of ECUs 18 to perform various functions at the corresponding location. Hereinafter, a detailed process of determining the position of the personal identification device 20 will be described.

Figure 5:
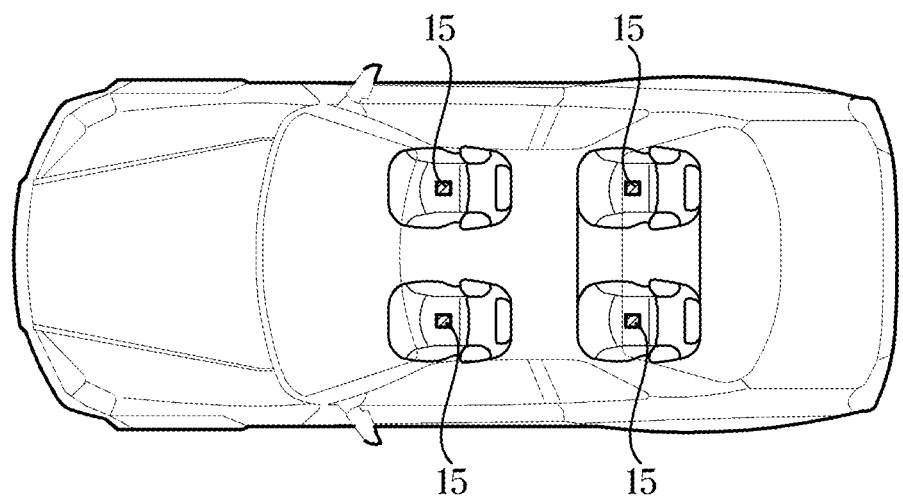
FIG. 5 is a view exemplarily illustrating the interior of a vehicle including a weight sensor.

FIG. 5 is a view exemplarily illustrating the interior of a vehicle including a weight sensor.

As shown in FIG. 5, each of the occupant seats may be provided with a weight sensor 15.

The weight sensor 15 is not limited any particular, and may be configured in any form as long as it is mounted on the occupant seat to detect riding (e.g, seating) of the occupant.

The weight sensor 15 may be mounted on the occupant seat to detect riding of the occupant.

When the communicator 14 detects the personal identification device 20 of the occupant and the weight sensor 15 detects that the occupant is accommodated, the processor 12 may determine the position of the personal identification device 20 based on the detection results of the communicator 14 and the weight sensor 15. In other words, the processor 12 may determine that the occupant is accommodated in the corresponding seat.

In response to determining the position of the personal identification device 20 according to the above-described process, the processor is configured to determine that the occupant is accommodated in the corresponding occupant seat, and generate a control signal for controlling the plurality of ECUs 18 to perform the pre-stored function matching the ID of the occupant in the corresponding occupant seat.

Hereinafter, a case in which the ID of the occupant does not match the ID pre-stored will be described.

Figure 6:
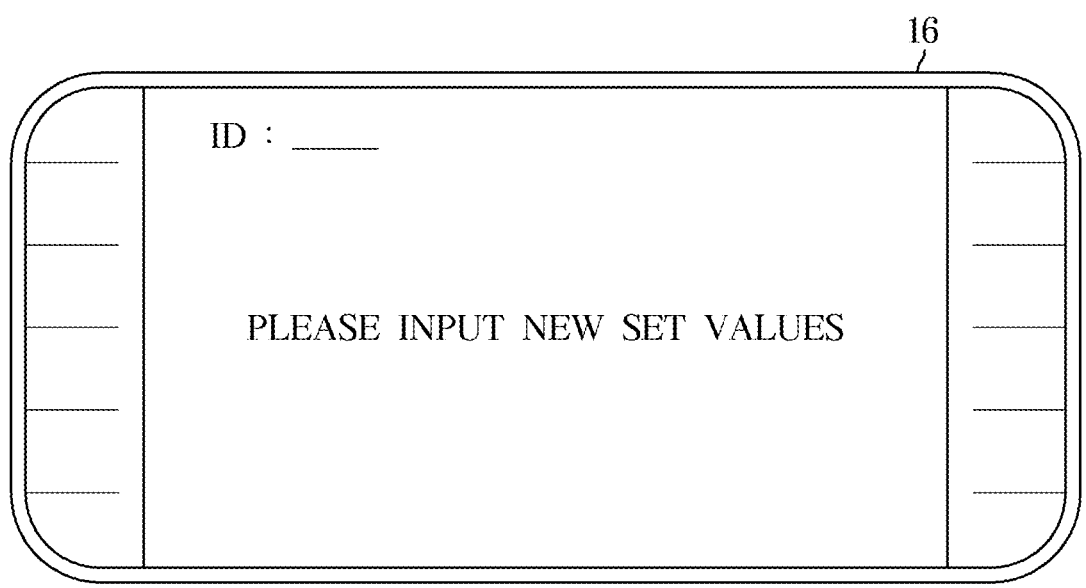
FIG. 6 is a view exemplarily illustrating a display screen for inputting a new set value.

FIG. 6 is a view exemplarily illustrating a display screen for inputting a new set value.

The processor 12, in response that the received ID of the occupant is not matched with the ID pre-stored in the memory 13, may provide a user interface to input a function setting value so that the function pre-stored may automatically performed when the occupant which is recognized as the first occupant in the vehicle re-enters the vehicle.

To provide such a user interface, the vehicle 10 may further include a display 16.

When the communicator 14 receives the new ID, the processor 12 may provide a user interface for inputting a function setting value to store a function for the new ID.

For example, the processor 12 may provide a user interface that allows the occupant to set the exemplary position of the seat 41, a degree of operation of the air conditioner, a position of the window 43, a degree of heat generation of the heating wire of the seat 41, and the like.

When the occupant inputs set values for these functions, the new ID of the occupant and the set values of these functions matching the ID may be stored in the memory 13.

Accordingly, when the occupant gets on the vehicle 10 again later, the processor 12 may generate a control signal for controlling the plurality of ECUs 18 to match the ID with the ID pre-stored in the memory 13 to perform the functions which is matched to the ID pre-stored.

Accordingly, by automatically performing the functions pre-stored by the occupant, convenience of the occupant of the vehicle 10 may be increased.

Furthermore, while driving, occupants may ride or a driver's change may occur as well. In the case that the driver who is driving moves to the occupant seat, it is necessary to automatically provide convenience the functions suitable for the occupant. Hereinafter, a case in which the driver's change occurs will be described.

Figure 7:
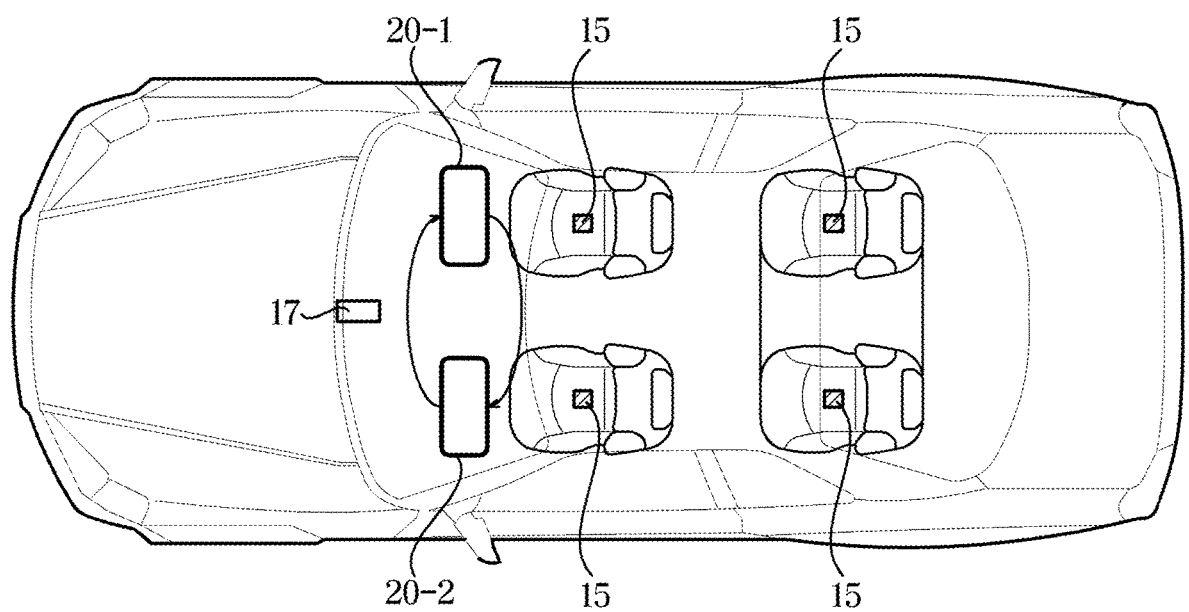
FIG. 7 is a view exemplarily illustrating elements for determining that a driver's change of a vehicle occurs.

FIG. 7 is a view exemplarily illustrating elements for determining that the driver's change occurs.

For the driver's change to occur, a process in which both the doors 44 of the driver seat side and the front passenger seat side are opened or closed is required. Accordingly, the processor 12 may primarily determine a case in which the doors 44 of the driver seat side and front passenger seat side are opened and closed.

When the change of the driver occurs, each occupant may move to a seat while carrying the personal identification device 20, or may move to a seat while leaving the personal identification device 20 in the vehicle 10.

Accordingly, in response that the position of the personal identification device 20 is changed or the weight detected by the weight sensor 15 is changed, the processor 12 may determine that the driver's change is occurred.

In response that the positions of a personal identification device 20-2 of the driver and a personal identification device 20-1 of the occupant who seats the front passenger seat are changed, the processor 12 may determine that the driver's change is occurred.

Furthermore, generally, because the weights of the driver and the occupant who seats the front passenger seat will be different, the processor 12 may determine that the driver's change is occurred in response that the weight sensor 15 detects the different in weight, Additionally, the vehicle 10 may further include a camera 17 to recognize a face of the driver.

The camera 17 may recognize the face of the driver and the occupant who seats the front passenger seat, and the processor 12 may determine that the driver's change is occurred in response that the faces of the driver and the occupant who seats the front passenger seat recognized by the camera 17 are different.

Accordingly, when the driver's change occurs, the communicator 14 may receive the ID of the personal identification device 20 of the occupant who seats the front passenger seat to automatically perform the functions in which the occupant moving to the front passenger seat had predetermined.

The processor 12 compares the received ID with the ID pre-stored in the memory 13, and when matched, generates a control signal for controlling the plurality of ECUs 18 to perform the functions which is matched to the ID pre-stored in the front passenger seat.

Furthermore, in response to determining that the driver's change is occurred, the processor 12 may perform automatically the functions predetermined by the driver. The communicator 14 receives the ID of the personal identification device 20 of the driver, and when matching by comparing the received ID with the ID pre-stored in the memory 13, the processor 12 may generate a control signal for controlling the plurality of ECUs 18 to perform the functions which is matched to the ID pre-stored.

For example, the pre-stored function may include adjusting the height of the seat 41 of the driver side, the position of the seat such as inclination of the backrest, the intensity and temperature of the air conditioner, the position of the window 43, and the heat generation of the heating wire of the seat 41.

Furthermore, the driving mode may be changed to a driving mode predetermined by the driver. When the driver had predetermined to drive in the economical mode, and in response to determining that the driver seats the driver seat, the processor 12 may generate a control signal for controlling the plurality of ECUs to change the driving mode of the vehicle 10 to the economical mode.

In response to determining the fact that the position of the personal identification device 20 does not change, the weights of the driver seat and the front passenger seat detected by the weight sensor 15 do not change, and the faces of the driver and the front passenger seat recognized by the camera 17 are the same, the processor 12 may determine that the driver's change is not occurred and perform existing control.

Even when the driver's change occurs in the present way, the processor 12 may automatically perform the functions that the changed driver or the occupant moved to the front passenger seat had predetermined, increasing the convenience of the occupant.

In the above description, only the change (or change) between the driver and the occupant who seats the front passenger seat is described, but is not limited thereto. The driver's change between the driver and the occupant who seats the rear passenger seat may also be occurred.

In the instant case, after detection of opening and closing the doors of the driver seat and the rear passenger seat, the vehicle may determine that the driver's change is occurred based on the position of the personal identification device 20, the change in the weight detected by weight sensor 15, and the recognition result of the camera 17 as described above.

Accordingly, the vehicle 10 detects the personal identification device 20 and automatically performs the functions that the occupant, who has the personal identification device 20, had predetermined, increasing convenience of the passenger of the vehicle 10.

Figure 8:
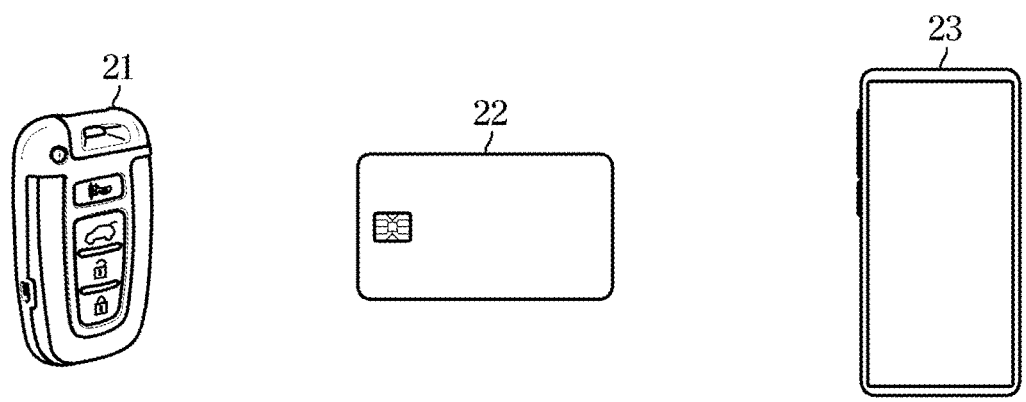
FIG. 8 is a view exemplarily illustrating types of personal identification devices.
Figure 9:
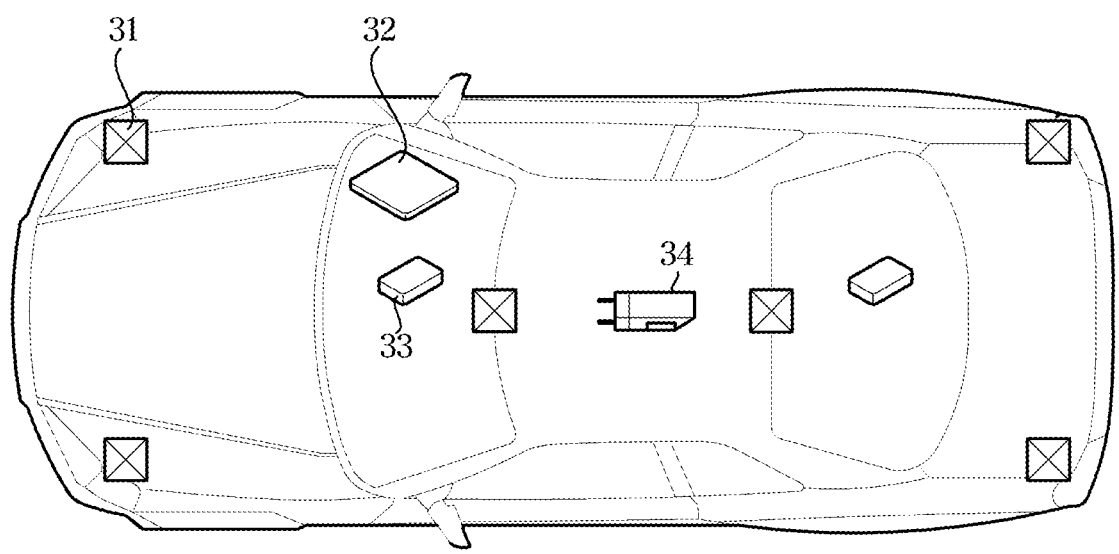
FIG. 9 is a view exemplarily illustrating a configuration of an antenna for communicating with each individual identification device.

FIG. 8 is a view exemplarily illustrating types of personal identification devices, and FIG. 9 is a view exemplarily illustrating a configuration of an antenna for communication with each individual identification device.

The personal identification device 20 may include any one of a Fob key 21, a Near Field Communication (NFC) card key 22, or a smart key 23 embedded in a smart phone.

The occupant may ride the vehicle 10 while holding any one of the Fob key 21, the NFC card key 22, or the smart phone 23 as the personal identification device 20, and the communicator 14 may detect the personal identification device 20 and receive the ID of the occupant embedded in the personal identification device 20.

Herein, the types of the personal identification device 20 described above are merely an exemplary, and may be configured in any form as long as the vehicle 10 may detect the occupant in possession of the personal identification device 20 including the ID of the occupant.

Referring to FIG. 9, different types of antennae may be included in the vehicle 10.

The antennae may include an ultra-wideband communication (UWB) antenna 31 for performing a ultra-wideband communication, a Bluetooth Low Energy (BLE) antenna 33 for performing a Bluetooth communication, and a Wireless Power Consortium (WPC)/NFC antenna 34 for performing a short-range wireless communication.

When the personal identification device 20 is the NFC card key 22, the WPC/NFC antenna 34 may be used to detect the personal identification device 20 and receive the ID of the occupant.

When the personal identification device 20 is the Fob key 21, NFC communication, BLE communication, and UWB communication are all available. Accordingly, the at least one of the UWB antenna 31, the BLE antenna 33, and the WPC/NFC antenna 34 may be used to detect the personal identification device 20 and receive the ID of the occupant.

When the personal identification device 20 is the smart key 23 embedded in the smart phone, NFC communication, BLE communication, and UWB communication are all available. Accordingly, the at least one of the UWB antenna 31, the BLE antenna 33, and the WPC/NFC antenna 34 may be used to detect the personal identification device 20 and receive the ID of the occupant.

Figure 10:
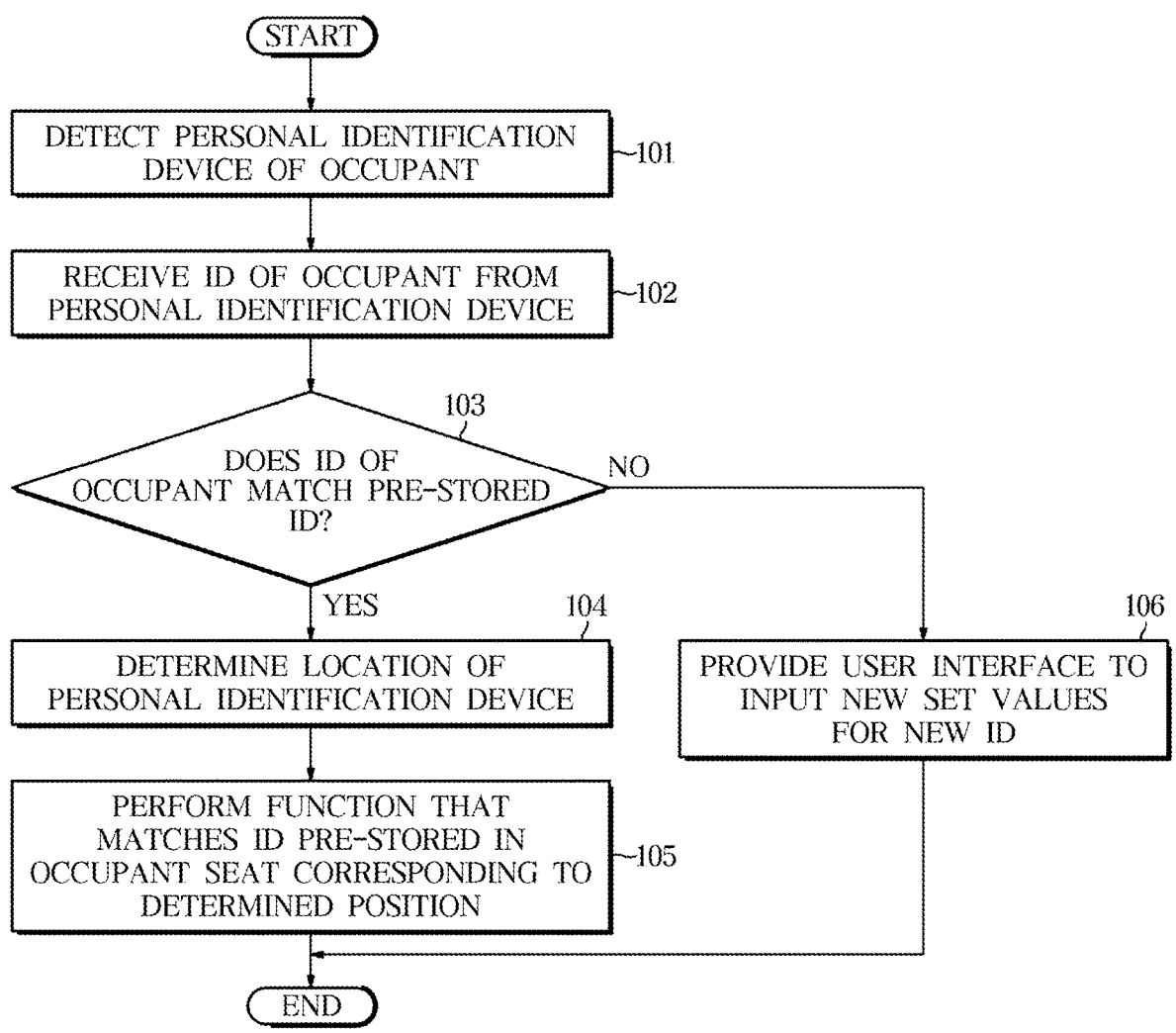
FIG. 10 is a flowchart illustrating a process of performing a function matching an ID pre-stored in a vehicle.

FIG. 10 is a flowchart illustrating a process of performing the functions matching an ID pre-stored in a vehicle.

When a person carrying the personal identification device 20 rides the vehicle 10, the communicator 14 may detect the personal identification device 20 of the occupant (S101).

In response to reception of the ID of the occupant from the detected personal identification device 20 (S102), the processor 12 may determine whether the received ID of the occupant matches the ID pre-stored in the vehicle 10 (S103).

As a result of the matching, in response to determining that the ID of the occupant matches the ID pre-stored (Yes in S103), the processor 12 may determine the position of the personal identification device 20 (S104), and generate a control signal to perform the functions that matches the ID pre-stored in the occupant seat corresponding to the determined position of the personal identification device 20 (S105).

As a result of the matching, in response to determining that the ID of the occupant does not match the ID pre-stored (No in S103), the processor 12 may provide the user interface to input a new set value for the new ID (S106).

When determining the position of the personal identification device 20, the position of the personal identification device 20 may be determined based on the ID of the occupant received from the personal identification device 20 of the occupant and the detected result of the weight sensor 15.

The function matching the ID pre-stored may include adjusting at least one of the position of the seat 41 of the occupant seat, the position of the seat 41 such as inclination of the backrest, the intensity and temperature of the air conditioner, the position of the window 43, and the heat generation of the heating wire of the seat 41.

Figure 11:
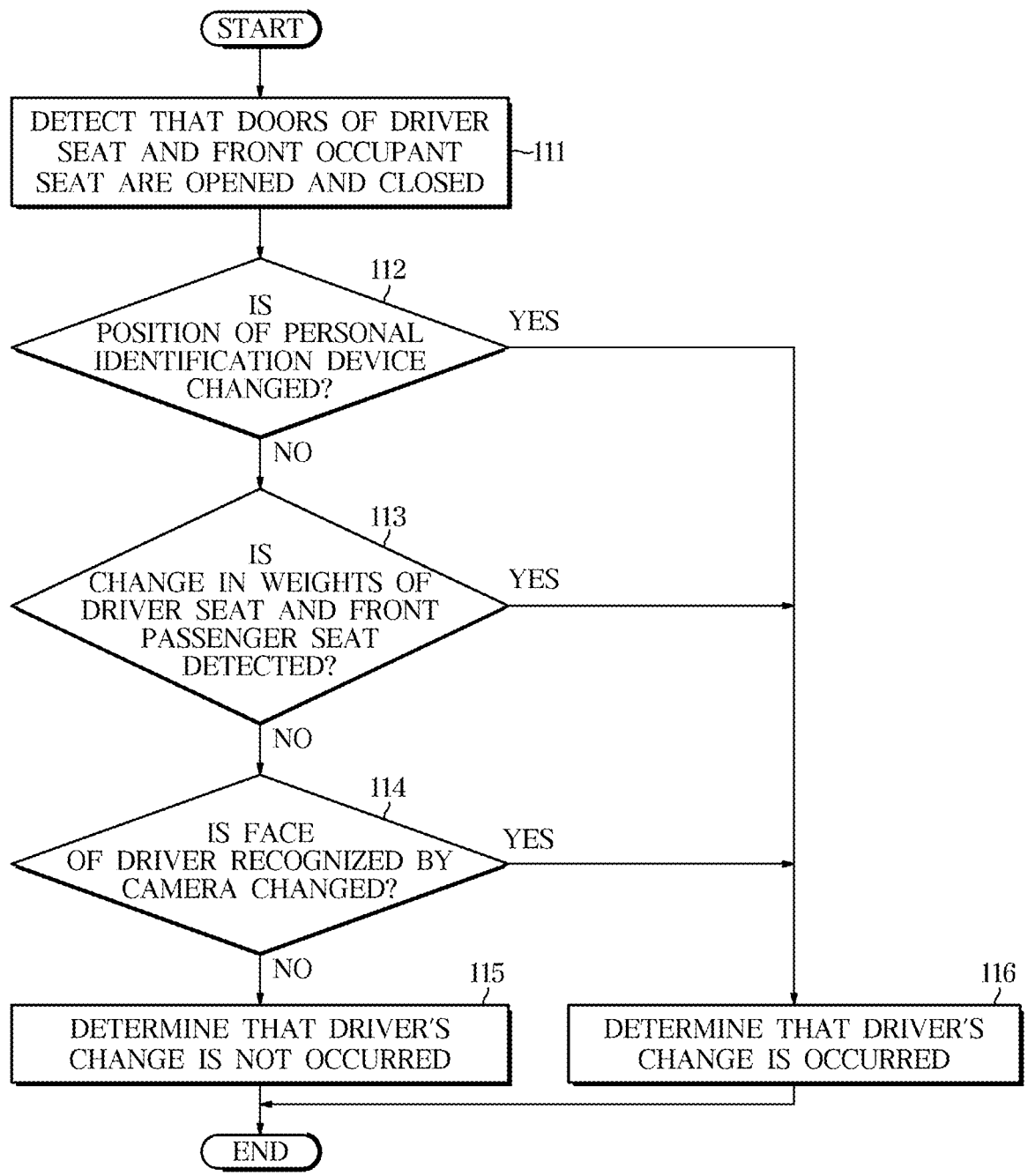
FIG. 11 is a flowchart illustrating a process of determining a case in which a driver's change of a vehicle is occurred.

FIG. 11 is a flowchart illustrating a process of determining a case in which the driver's change is occurred.

In response to detecting that the doors 44 of the driver seat side and the front occupant seat side are opened or closed (S111), the vehicle 10 may determine whether the position of the personal identification device 20 is changed from the occupant seat to the driver seat or from the driver seat to the front occupant seat (S112).

As a result of the determination, in response to determining that the position of the personal identification device 20 is changed (Yes in S112), the vehicle 10 may determine that the driver's change is occurred (S116).

As a result of the determination, in response to determining that the position of the personal identification device 20 is not changed (No in S112), the vehicle 10 may determine whether a change in the weights of the driver seat and the front passenger seat is detected (S113).

In response to determining that the weight is changed (Yes in S113) as a result of the determination, the vehicle 10 may determine that the driver's change is occurred (S116)

In response to determining that the weight is not changed (No in S113) as a result of the determination, the vehicle 10 may determine whether the faces of the driver and the occupant who seats on the front passenger seat that are recognized by the camera are changed (S114).

In response to determining that the recognized faces are changed (YES in S114) as a result of the determination, the vehicle 10 may determine that the driver's change is occurred (S116).

In response to determining that the recognized faces are not changed (No in S114), the vehicle 10 may determine that the driver's change is not occurred (S115).

In response to determining that the driver's change is not occurred, the vehicle 10 is maintained to the existing control In response to determining that the driver's change is occurred, the vehicle 10 may generate the control signal for controlling the plurality of ECUs to perform the functions that matches the ID pre-stored in the front passenger seat in the case that the ID of the occupant who seats on the front passenger seat matches the ID pre-stored.

As is apparent from the above, embodiments of the present disclosure may provide a vehicle configured for enhancing convenience of passengers by automatically performing the functions pre-stored when a passenger, who has a personal identification device embedded an ID pre-stored in a vehicle, gets on the vehicle, and a method of controlling the same.

Furthermore, the exemplary embodiments of the present disclosure may provide a vehicle in which the functions pre-stored by a passenger moving to a passenger seat is automatically performed to facilitate convenience when the driver's change occurs, and a method of controlling the same.

On the other hand, the above-described embodiments may be implemented in a form of a recording medium storing commands executable by a computer. The commands may be stored in a form of program code. When the commands are executed by a processor, a program module is generated by the commands so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a plurality of electronic control units (ECUs);
   a communicator configured to detect a personal identification device of an occupant and receive an identification (ID) of the occupant from the personal identification device of the occupant; and
   at least one processor electrically connected to the communicator and configured to determine a position of the personal identification device;
   wherein the at least one processor is configured to:
   in response that the ID of the occupant corresponds to an pre-stored ID,
   generate a control signal for controlling the plurality of ECUs to perform a function that matches a pre-stored ID for an occupant seat corresponding to the determined position,
   wherein, when doors of a driver seat and a front passenger seat of the vehicle are opened or closed, the at least one processor is configured to conclude that a driver's change is occurred in response that the position of the personal identification device is changed from the front passenger seat to the driver seat or from the driver seat to the front passenger seat, or weights of the driver seat and the front passenger seat are changed, and
   wherein, in response to concluding that the driver's change is occurred, the at least one processor is configured to generate a control signal for controlling the plurality of ECUs to perform a function that matches the pre-stored ID for the front passenger seat when the ID of the occupant who seats the front passenger seat matches the pre-stored ID.

2. The vehicle of claim 1, wherein the at least one processor is configured to determine the position of the personal identification device in response that the ID of the occupant corresponds the pre-stored ID.

3. The vehicle of claim 2, further including:
   a plurality of weight sensors mounted on each of occupant seats;
   wherein the at least one processor is configured to determine the position of the personal identification device according to the ID of the occupant received by the communicator from the personal identification device of the occupant and detected results of the plurality of weight sensors.

4. The vehicle of claim 1, wherein the function matching the pre-stored ID includes at least one of adjusting a position of the occupant seat, adjusting an air conditioner of the vehicle, adjusting a window of the vehicle, and adjusting a heating wire of the occupant seat.

5. The vehicle of claim 1, further including a display,
   wherein the at least one processor is configured to provide a user interface to the display for inputting a new set value for a new ID in response that the ID of the occupant does not match the pre-stored ID.

6. The vehicle of claim 1, further including a camera,
   wherein the at least one processor is configured to conclude that the driver's change is occurred in response that a face of the driver photographed by the camera changes.

7. The vehicle of claim 1, wherein the personal identification device includes one of a smart key, a card key, or a Fob key embedded in a smart phone.

8. The vehicle of claim 1, wherein the communicator includes one of an ultra-wideband communication (UWB) antenna, a Bluetooth Low Energy (BLE) antenna, or a Wireless Power Consortium (WPC)/Near Field Communication (NFC) antenna.

9. A method for controlling a vehicle, the method comprising:
   detecting a personal identification device of an occupant;
   receiving, by at least one processor, an identification (ID) of the occupant from the personal identification device of the occupant;
   determining, by the at least one processor, a position of the personal identification device in response that the ID of the occupant matches a pre-stored ID;
   generating, by the at least one processor, a control signal for controlling a plurality of electronic control units (ECUs) to perform a function that matches the pre-stored ID for an occupant seat corresponding to the determined position;
   concluding, by the at least one processor, that a driver's change is occurred in response that a face of the driver photographed by a camera changes; and
   in response to concluding that the driver's change is occurred, generating, by the at least one processor, a control signal for controlling the plurality of ECUs to perform a function that matches the pre-stored ID for a front passenger seat when the ID of the occupant who seats the front passenger seat matches the pre-stored ID.

10. The method of claim 9, wherein the determining includes determining the position of the personal identification device according to the ID of the occupant received from the personal identification device of the occupant and a result of detection of a plurality of weight sensors.

11. The method of claim 9, wherein the pre-stored function includes at least one of adjusting a position of the occupant seat, adjusting an air conditioner of the vehicle, adjusting a window of the vehicle, and adjusting a heating wire of the occupant seat.

12. The method of claim 9, further including:
providing, by the at least one processor, a user interface for inputting a new set value for a new ID in response that the ID of the occupant does not match the prestored ID.

13. The method of claim 9, further including:
when doors of a driver seat and a front passenger seat of the vehicle are opened or closed,
concluding, by the at least one processor, that the driver's change is occurred in response that the position of the personal identification device is changed from the front passenger seat to the driver seat or from the driver seat to the front passenger seat, or weights of the driver seat and the front passenger seat are changed.

14. The method of claim 9, wherein the personal identification device includes one of a smart key, a card key, or a Fob key embedded in a smart phone.

15. The method of claim 9, wherein the detecting and the determining include using one of an ultra-wideband communication (UWB) antenna, a Bluetooth Low Energy (BLE) antenna, or a Wireless Power Consortium (WPC)/Near Field Communication (NFC) antenna.

* * * * *